United States Patent
Yadav et al.

(10) Patent No.: US 12,353,363 B2
(45) Date of Patent: *Jul. 8, 2025

(54) SYNCHRONIZATION OF GRAPHICAL DATA

(71) Applicant: Nuvolo Technologies Corporation, Paramus, NJ (US)

(72) Inventors: Tejas Yadav, West Haven, CT (US); Tao Ye, Cypress, TX (US); Khoa Nguyen Van Ho, Houston, TX (US)

(73) Assignee: NUVOLO TECHNOLOGIES CORPORATION, Davidson, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/441,592

(22) Filed: Feb. 14, 2024

(65) Prior Publication Data
US 2024/0264980 A1  Aug. 8, 2024

Related U.S. Application Data

(63) Continuation of application No. 17/570,014, filed on Jan. 6, 2022, now Pat. No. 12,038,880.
(Continued)

(51) Int. Cl.
*G06F 16/178* (2019.01)
*G06F 16/11* (2019.01)
(Continued)

(52) U.S. Cl.
CPC .......... *G06F 16/178* (2019.01); *G06F 16/116* (2019.01); *G06F 16/2365* (2019.01); *G06T 11/60* (2013.01); *G06T 2210/04* (2013.01)

(58) Field of Classification Search
CPC .. G06F 16/178; G06F 16/116; G06F 16/2365; G06F 2111/02; G06F 30/10; G06T 11/60; G06T 2210/04
See application file for complete search history.

(56) References Cited

U.S. PATENT DOCUMENTS 6,341,291 B1  1/2002  Bentley et al.
6,721,769 B1  4/2004  Rappaport et al.
(Continued)

OTHER PUBLICATIONS

Chen et al., "Floor-SP: Inverse CAD for Floorplans by Sequential Room-wise Shortest Path", IEEE International Conference on Computer Vision (ICCV), 2019, 10 pages.
(Continued)

*Primary Examiner* — Debbie M Le
(74) *Attorney, Agent, or Firm* — Womble Bond Dickinson (US) LLP

(57) ABSTRACT

Methods, systems, and apparatus, including computer programs encoded on a computer storage medium, for interpreting data in a drawing file. A graphics sync module of a system performs synchronization between graphical data in the drawing file and graphical data in a space management database. Each layer of the drawing file includes graphical data used to digitally render items of a floor map. The system identifies a grouping of layers from the drawing file and retrieves values from a space management database ("SMD") that includes records with values for entities that correspond to items of the floor map. The graphics sync module extracts values of the graphical data for a layer and synchronizes graphical data for different layers of the drawing file with graphical data in entity records stored in the space management database.

23 Claims, 5 Drawing Sheets

Related U.S. Application Data

(60) Provisional application No. 63/134,949, filed on Jan. 7, 2021, provisional application No. 63/134,892, filed on Jan. 7, 2021.

(51) Int. Cl.
    *G06F 16/23*     (2019.01)
    *G06T 11/60*     (2006.01)

(56) References Cited

U.S. PATENT DOCUMENTS

| | | | |
|---|---|---|---|
| 8,155,943 | B2 | 4/2012 | Nasle |
| 8,484,556 | B2 * | 7/2013 | McMillan ............... G06T 17/00 |
| | | | 715/209 |
| 8,818,769 | B2 | 8/2014 | Trainer et al. |
| 9,454,623 | B1 | 9/2016 | Kaptsan |
| 10,121,286 | B2 | 11/2018 | Alsaffar et al. |
| 10,445,438 | B1 | 10/2019 | Motonaga et al. |
| 10,733,333 | B2 | 8/2020 | Chen et al. |
| 10,937,033 | B1 | 3/2021 | Rodriguez et al. |
| 11,531,885 | B2 | 12/2022 | Sollami et al. |
| 2004/0046760 | A1 | 3/2004 | Roberts et al. |
| 2007/0186160 | A1 * | 8/2007 | McArdle ............... G06F 30/00 |
| | | | 707/999.201 |
| 2007/0226314 | A1 | 9/2007 | Eick et al. |
| 2008/0062195 | A1 | 3/2008 | Brown et al. |
| 2008/0172605 | A1 | 7/2008 | Smith |
| 2010/0169272 | A1 | 7/2010 | Labatte et al. |
| 2015/0106325 | A1 | 4/2015 | Cole et al. |
| 2015/0293941 | A1 | 10/2015 | Eichhorn |
| 2015/0379957 | A1 | 12/2015 | Roegelein et al. |
| 2016/0246899 | A1 | 8/2016 | Hirschtick et al. |
| 2016/0328421 | A1 | 11/2016 | Sarratori et al. |
| 2017/0147717 | A1 | 5/2017 | Chen et al. |
| 2018/0052832 | A1 | 2/2018 | Anglin et al. |
| 2018/0113878 | A1 | 4/2018 | Duggal et al. |
| 2019/0213287 | A1 * | 7/2019 | Ye ........................... G06F 16/29 |
| 2019/0228020 | A1 * | 7/2019 | Sawatzky ............. G06F 16/275 |
| 2020/0285514 | A1 | 9/2020 | Ghare et al. |
| 2020/0351337 | A1 | 11/2020 | Calmon et al. |
| 2020/0401593 | A1 | 12/2020 | Panuganty et al. |
| 2021/0073449 | A1 | 3/2021 | Segev et al. |
| 2021/0383037 | A1 | 12/2021 | Segev et al. |
| 2022/0067454 | A1 | 3/2022 | Gupta et al. |
| 2022/0092225 | A1 | 3/2022 | Parker et al. |
| 2022/0092834 | A1 | 3/2022 | Ye et al. |
| 2022/0171892 | A1 | 6/2022 | Ho et al. |
| 2022/0171893 | A1 | 6/2022 | Ye et al. |
| 2022/0188472 | A1 | 6/2022 | Parker |
| 2022/0206445 | A1 | 6/2022 | Reichl et al. |
| 2022/0206856 | A1 | 6/2022 | Parker |
| 2022/0215604 | A1 | 7/2022 | Ho et al. |
| 2023/0068093 | A1 | 3/2023 | Malekian et al. |

OTHER PUBLICATIONS

Condie et al., "Online Aggregation and Continuous Query Support in Mapreduce", SIGMOD, 2010, 1115-1118.

Ekanayake et al., "MapReduce for Data Intensive Scientific Analysis", Fourth IEEE International Conference on eScience, 2008, pp. 277-284.

github.com, "Deepzoom (PHP Library)", Daniel-KM Library Deepzoom, retrieved on Aug. 17, 2020, retrieved from URL: https://github.com/Daniel-KW /LibrarvDeepzoom, Aug. 17, 2020, 4 pages.

github.com, "TiledSharp", Marshallward/TiledSharp, retrieved on Aug. 17, 2020, retrieved from URL: https://github.com/marshallward/TiledSham, Aug. 17, 2020, 4 pages.

Muller et al., "Procedural Modeling of Buildings", Association for Computing Machinery, Inc, 2006, 25(3), pp. 614-623.

stackexchange.com,"If Geographic Coordinates are Unprojected Coordinates, How Can GIS Soft Wares Display Such Unprojected Data in a Plane?", Geographic Information Systems Geographic Information Systems, retrieved on Apr. 15, 2024, retrieved from URL:https://gis.stackexchange.com/questions/146321/if-geographic-coordinates-are-unprojected-coordinates-how-can-gis-softwares-dis, Jun. 2, 2020, 2 pages.

Wikipedia, "Map Projection", https://en.wikipedia.org/w/index.php?title=Map projection&oldid=955953903, 2020, 16 pages.

Wikipedia, "Spatial Reference System", https://en.wikipedia.org/w/index.php?title=Spatial_reference_system&oldid=956142752, 2020, 4 pages.

Wikipedia, "Tiled Web Map", https://en.wikipedia.org/wiki/Tiled_web_map, 2020, 3 pages.

Zhu et al., "A New Reconstruction Method for 3D Buildings From 2D Vector Floor Plan", HAL Open Science, Dec. 19, 2013, 1-14 (15 pages).

* cited by examiner

SYNCHRONIZATION OF GRAPHICAL DATA

CROSS-REFERENCE TO RELATED APPLICATION

The present application is a continuation of a U.S. Patent Application having U.S. patent application Ser. No. 17/570,014, filed Jan. 6, 2022, which claims the benefit of a U.S. Provisional Patent Application having U.S. Provisional Patent Application No. 63/134,892, filed Jan. 7, 2021, entitled "SYNCHRONIZATION OF GRAPHICAL DATA," and another U.S. Provisional Patent Application having U.S. Provisional Patent Application No. 63/134,949, filed Jan. 7, 2021, entitled "LAYER MAPPING." The entire disclosures of U.S. Provisional Patent Applications having U.S. Provisional Patent Application No. 63/134,892 and U.S. Provisional Patent Application No. 63/134,949 are incorporated herein by reference in their entireties.

This application is also related to U.S. patent application Ser. No. 17/345,794, filed Jun. 11, 2021, entitled "LAYER MAPPING," the disclosure of which is also incorporated herein by reference in its entirety.

BACKGROUND

This application relates to computing processes for converting electronic files.

DXF files are generated by an example computer-aided design ("CAD") program (e.g., commercial CAD programs or drafting software applications) and encode data representations of real-world constructs. For example, the data representations can be two dimensional floorplans for a building, where the floorplans include different outlines for each room of a floor. Data representations of real-world constructs in separate DXF files can be encoded and arranged differently based on preferences and design choices used in the CAD program. Because data representations can be encoded in DXF files in a variety of ways, interpreting DXF files can be challenging.

SUMMARY

A graphics sync module of an example computing system is described.

The graphics sync module is configured to extract graphic elements of an example drawing file. The graphics sync module executes its respective extraction and syncing operations based on inputs that correspond to an audit output file generated by an audit module of the system and data associated with one or more drawing files obtained by the system.

The graphics sync module executes an example workflow for reading and exporting graphical (or spatial) elements of layer data for each of the layers in a grouping specified by the mapping output. In some implementations, to export this graphical data of the layers, the graphics sync module calculates dimensional bounds that are used to generate: i) an interactive layer represented by a GeoJSON file and ii) a visual layer represented by a scale vector graphics (SVG) file.

Using outputs of the graphics sync module, the system can generate a merged graphics layer by overlaying dimensional coordinates of a GeoJSON file over dimensional coordinates of a scale vector graphics ("SVG") file or one or more images tiles generated from the SVG file.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments to realize one or more of the following advantages. Drawing files can be processed and interpreted such that certain portions of graphical data for each layer of the drawing file can be synchronized with corresponding graphical data stored in a space management database. For example, graphical data in a drawing file that is used to digitally render an office of a floor map can be automatically extracted and synchronized with graphical data that corresponds to a version of the office that is stored at the space management database.

The described techniques provide a standardized framework that streamlines a process of maintaining the most current graphical data for a given set of graphical data structures stored in the space management database. The framework provides a computationally efficient approach for synchronizing graphical elements between two sources of graphical data, such as the drawing file and the database, and preserves the integrity of graphical data as information is transferred or exchanged between the drawing file and space management database.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
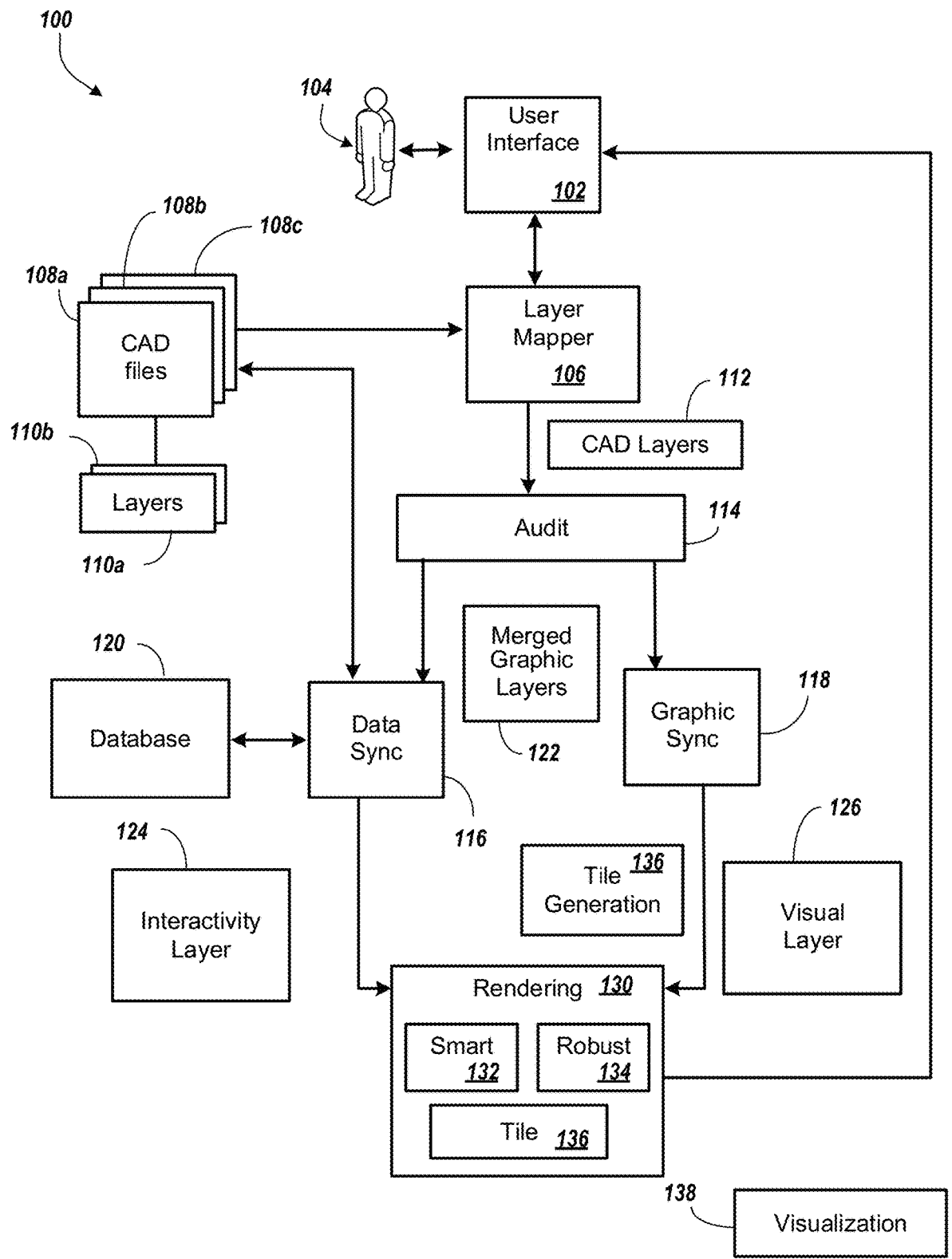
FIG. 1 illustrates an example computing system for obtaining information from one or more drawing files.

FIG. 1 illustrates an example computing system 100 ("system 100") configured to process one or more drawing files that each include multiple layers. Each layer of a respective drawing file can correspond to an item of a geographic entity, such as a building or physical location. For example, each of the multiple layers can correspond to a respective item such as a floorplan of a floor in the building, a room of a floor in the building that is represented by the floorplan, or an interior or exterior wall of a room included in the floorplan. Additional details about individual layers and corresponding items that may be associated with a given layer are described in more detail below.

In some implementations, the system 100 is configured to implement a framework for interpreting and extracting graphics and data elements of an example drawing file to digitally render the items of a building for presentation to the user 104. The graphics and data elements cooperate to present a digital representation of the items in an application program used to generate the drawing file. For example, the drawing file can be a DXF file generated by an example computer-aided design ("CAD") program and encode data representations of real-world items, such as the example items described above. Example drafting/design programs may include various commercial CAD tools or related drafting software applications.

Data representations of real-world items in separate or distinct drawing files, or even across distinct layers of a drawing file, can be encoded and arranged differently based on design preferences and drafting protocols used in the CAD program. Because these data representations are often encoded in a variety of ways, extracting specific types of information from a drawing file can be challenging. To address these challenges, the system 100 includes a set of modules that are each configured to execute a subset of the techniques for implementation of the framework used to extract graphics and data elements of a drawing file or present at least some of the extracted graphics, data elements, or both.

The system 100 generally includes a user interface 102 that receives input from a user 104. The user interface 102 can be a graphical interface rendered for display at an example computing device of the system 100. Although not depicted in the example of FIG. 1, the computing device can be any known device operable to display a graphical interface, such as a desktop computer with a display monitor, a laptop computer, a tablet device, a smartphone, a networked client/mobile device, or other related devices. The computing device is operable to exchange data communications with other devices (e.g., client and server devices) of the system 100.

The system 100 includes a layer mapper 106 configured to receive drawing files 108a, 108b, 108c ("drawing files 108"). Each drawing file 108a, 108b, 108c includes one or more layers indicated generally as layers 110a, 110b. In some implementations, the layer mapper 106 obtains the drawings files 108 based on input from user 104 that is received by way of user interface 102. The layer mapper 106 can receive or obtain the drawing files 108 independent of input from user 104 but execute its file audit and data processing operations based on user input received by way of user interface 102.

In some implementations, the layer mapper 106 automatically imports the drawing files 108 from a file storage location and automatically executes its layer mapping and data processing operations. The file storage location may be internal or external to the system 100. For example, the file storage location may correspond to a database 120 (described in more detail below) that includes database tables for storing information about space hierarchies of a geographic location. The space hierarchies may define a physical layout of a region, campus, site, or floor of the geographic location.

The layer mapper 106 is configured to receive or obtain, as inputs, each of the drawing files 108 and generate a layer mapping file based on processes performed on the received inputs. The processes may be executed by the layer mapper 106 based on a mapping template, user input from user 104, or both. In some implementations, the layer mapper 106 generates a layer mapping file based on instructions or commands specified by a space/system administrator ("space admin") that indicate operations to be performed on the drawing files 108. The instructions can define or indicate layers of the drawing files 108 as well as computer-aided facility management ("CAFM") layers stored among database tables of the system 100.

The layer mapper 106 can select a mapping template that defines protocols for aggregating sets of data values of the different layers with respect to instructions and database values of CAFM layers as indicated by a space admin. For example, the layer mapper 106 can receive layer data for multiple layers of a drawing file 108b, where the layer data specifies information for items such as hallways, offices on a floor, types of furniture in the offices, locations of security cameras on the floor, or capabilities of various Wi-Fi hotspots on the floor. The layer mapper 106 can use the template protocols to aggregate values for types of office furniture for a particular office while, for example, filtering out data values that indicate locations of security cameras on a floor.

More specifically, for one or more drawing files 108, the layer mapper 106 can map portions of the layer data for different layers, such as furniture in the offices, to a hierarchy of CAFM layers (e.g., indicating each office on a floor) as defined in the database to produce a grouping of CAD layers 112. For example, the grouping of CAD layers 112 can represent a group of offices on the 9th floor of a building along with each item of furniture in each office of the group. In some implementations, one or more drawing files 108 include multiple CAD layers, and a grouping of these multiple CAD layers can be represented by one SVG file. In such cases, the layer mapper 106 can map the multiple CAD layers represented by the one SVG file to a CAFM layer, resulting in there being a single SVG file for one CAFM layer. For instance, tables, chairs, doors layers represented by a single SVG file can be grouped into a single CAFM layer called Furniture, in which case there can be one SVG file for the one CAFM layer. In some implementations, the layer mapper 106 determines the mapping between the drawing layers and the CAFM layers at least by processing data values of the different drawing layers (e.g., received inputs) against the protocols defined by the mapping template and with reference to any grouping preferences indicated by the user 104 or the space admin.

The layer mapper 106 generates a layer mapping output represented by CAD layers 112 based on the mapping between layers of the drawing files 108 and CAFM layers in a database table of the system 100. In some implementations, the layer mapper 106 generates a layer mapping output that aggregates information such as data values and entity records of the received inputs based on the determined mapping of the layers. The layer mapper 106 can generate a layer mapping output that groups layer types such as the offices, the Wi-Fi hotspots, and the types of office furniture for visual rendering to an end-user, e.g., user 104 or a different user.

An audit module 114 receives or obtains, as inputs, each of the CAD layers 112 or an output of the layer mapper 106, and generates an audit output file based on processes performed on the received inputs. For example, the audit module 114 is configured to process data corresponding to each of the CAD layers 112 to identify one or more deficiencies and generate an audit output file based on the identified deficiencies. The audit module 114 can scan each of the CAD layers 112 to detect or identify individual deficiencies that will disrupt or adversely impact a file (or layer) importation process executed by the system 100. For example, the audit module 114 can read entity records that store data values for a layer to detect deficiencies such as unclosed polylines, missing space codes, missing space names, or invalid space types. In some implementations, the audit module 114 detects deficiencies of a drawing file in response to processing data types of a layer or entity record of the drawing file against a predefined list of deficiency codes.

The audit module 114 can be configured to generate recommendations for addressing detected deficiencies of a drawing file. For example, the audit module 114 can generate a signal for a detected deficiency in response to determining that a data type for a space name linked to a layer, e.g., among CAD layers 112, is missing a value for the space code. The audit module 114 can determine that the layer corresponds to a room of a floor plan and generate a recommendation for updating the value of the space code to, for example, "room" or "office." In some implementations, the audit module 114 generates an instruction or command to automatically input a value for the missing space code.

In general, the audit module 114 is configured to standardize layer data of a drawing file for processing by one or more other modules or devices of the system 100. In the example of FIG. 1, the audit module 114 generates an audit output file from one or more groupings of CAD layers 112 based on processes performed on each of the layers 112. The audit module 114 can provide the audit output file to two distinct modules included in the system 100 that perform respective sets of operations for syncing data and graphics for each CAD layer 112 processed by the audit module 114.

The system 100 includes a data sync module 116 and a graphics sync module 118. As described above, the system 100 interprets and extracts graphics and data elements of an example drawing file at least to digitally render certain real-world items of a building for visualization to an end-user. The data sync module 116 is configured to extract the data elements of the example drawing file, whereas the graphics sync module 118 is configured to extract the graphic elements of the drawing file. Each of the data sync module 116 and the graphics sync module 118 executes its respective extraction and syncing operations based on inputs that correspond to the audit output file generated by the audit module 114 and the data associated with the one or more drawing files 108.

In general, the data sync module 116 executes an example workflow for extracting data values of layers identified in the mapping output and for generating data structures used to stage or preview information linked to groupings of layers in the mapping output. Relatedly, the graphics sync module 118 executes an example workflow for reading and exporting graphical (or spatial) elements of layer data for each of the layers in a grouping specified by the mapping output. In some implementations, to export this graphical data of the layers, the graphics sync module 118 calculates dimensional bounds that are used to generate: i) an interactive layer 124 represented by a GeoJSON file and ii) a visual layer 126 represented by a scale vector graphics (SVG) file.

For example, a drawing file (e.g., a DXF file) can include input data such as but not limited to boundary parameters that are defined within the drawing file. The drawing file may include a floor map and the boundary parameters can be two-dimensional (2D) coordinates of points of a 2D shape (e.g., rectangular shape) enclosing or overlaying the floor map. For instance, the 2D coordinates can be the XY-coordinates of the extreme end points or boundary limits of the rectangular shape. In some implementations, the dimensional bounds that are used to generate the interactive layer 124 and the visual layer 126 are calculated or determined based on the boundary parameters. For example, the dimensional bounds can be used to generate the interactive layer 124 and the visual layer 126 so that the former overlays the latter.

In some embodiments, the dimensional bounds are calculated from SVG files, which contain both interactive and visual layers, using boundary parameters in the SVG files. In some instances, DXF files may include only interactive layers, and in such cases, SVG files can have larger boundary parameters for some layers when compared to the DXF files (e.g., because the SVG files contain both interactive and visual layers while DXF files contain only interactive layers), and the dimensional bounds may then be calculated using the larger boundary parameters of the SVG files. In some instances, the layer mapper 106 adjusts positioning between interactive layers translated from DXF files on top of one or more image tiles generated from the SVG files. The adjustment allows static SVG entities to match with the dynamic DXF translated entities, and the layer mapper 106 uses the dimensional bounds to perform said adjustment.

The respective outputs of the data sync module 116 and graphics sync module 118 may be stored in a database 120 and later accessed to generate a preview of the data and graphics for a layer or floorplan before final visual rendering. Additionally, using outputs of the graphics sync module 118, the system 100 can generate a merged graphics layer 122 by overlaying dimensional coordinates of a GeoJSON file over dimensional coordinates of a scale vector graphics ("SVG") file or one or more images tiles generated from the SVG file. The merged graphics layer can be used for presentation of the preview of the data and graphics for the layer or floorplan, presentation of a final version of the layer or floorplan, or both. In some implementations, the system 100 generates the merged graphics layer 122 based on intelligent analytics and calculations related to spatial coordinates and bounds for respective coordinate systems of the SVG file and GeoJSON file or the one or more image tiles and the GeoJSON file. For example, as discussed above, the XY-coordinate points of a boundary of a 2D shape (e.g., rectangular shape) are calculated to in turn calculate or determine dimensional bounds that are used to generate the interactive layer 124 and the visual layer 126 where the former overlays the latter. This is described in more detail below.

To improve presentation of the merged graphics layer 122, a tile generation module 128 can generate multiple image tiles from an SVG file. The image tiles can have smaller file sizes, smaller dimensions, or both, than the SVG file. As a result, the system 100 can require fewer resources for presentation the image tiles on the user interface 102 than if the system 100 used the SVG file alone. For instance, when each image tile has a smaller file size, each image tile requires less memory than the memory required to store the SVG file. Further, the system 100 can send an image tile to the computing device more quickly than an SVG file because of the smaller file size.

In some implementations, the computing device that presents the user interface 102 can render the image tile more efficiently than the SVG file because of the smaller file size. When multiple image tiles depict the data for a single SVG file, the computing device can use multi-threading support, whether virtual or actual, to more quickly present the image tiles on the user interface 102 than presentation of the SVG file on the user interface 102. The computing device can use a first thread for presentation of a first image tile and a second thread for presentation of a second image tile.

The tile generation module 128 can decouple image tile generation from the graphic sync process by offloading image tile generation to a separate background process. For example, the graphics sync module 118 can extract graphic elements from a drawing file to generate an SVG file. After generation of the SVG file, the tile generation module 128 can generate the image tiles from the SVG file. Because image tile generation can take longer than the graphic element extraction process, the graphics sync module 118 can generate only an SVG file which generation process is faster than the image tile generation. This can enable the system 100 to present the merged graphics layer 122, e.g., in the user interface 102, using an SVG file, rather than image tiles more quickly than if the system 100 waited until the image tile generation process completed. Once the tile generation module 128 finishes generation of some of the image tiles, the system 100 can then use the image tiles for the merged graphics layer 122, taking advantage of the smaller file sizes of the image tiles.

The system 100 includes a rendering module 130 that leverages tile generation technology to visually (or graphically) render data and graphics for layers specified by the layer mapping output. In the example of the FIG. 1, the rendering module 130 is coupled for communication with user interface 102 to provide output parameters (e.g., data and graphics elements) for graphically rendering information for a layer as a display output at the user interface 102.

The rendering module 130 includes logic for a smart renderer 132 as well as for a robust renderer 134. The smart renderer 132 is configured to intelligently switch between non-tile SVG files and image tiles to improve presentation of the merged graphic layers 122 in the user interface 102. In some implementations, the smart renderer 132 enables the rendering module 130 to perform its rendering functions using fewer processor cycles, less memory resources, or both, when dynamic tiling functions of the smart renderer 130 are invoked at the rendering module 130. In some implementations, the smart renderer 132 can enable presentation of the merged graphics layer 122 more quickly using an SVG file than if the merged graphics layer 122 were only presented using image tiles. Hence, the smart renderer 132 can provide improved efficiency relative to other approaches for rendering graphical data at a display.

The robust renderer 134 is configured to overlay data or dimensional coordinates of the GeoJSON file on top of the data or dimensional coordinates of the SVG file, e.g., for the merged graphics layer 122. This overlay feature of the robust renderer 134 is related to the merged graphics layer 122 and intelligent analytics functions described earlier. More specifically, the robust renderer 134 can be used to execute the intelligent analytics and calculations related to spatial coordinates and bounds for respective coordinate systems of the SVG file and GeoJSON file. The robust renderer 134 allows for cooperation between, and integration of, different coordinate systems to allow for improved visualization (138) of data and graphical elements of drawing layers, e.g., when data for the merged graphics layer 122 is presented on the user interface 102.

When the merged graphics layer 122 includes an interactive GeoJSON layer and multiple image tiles, a tile renderer 136 can coordinate presentation of the GeoJSON layer with the image tiles. For instance, the tile renderer 136 can obtain x-y coordinates in computer-aided design ("CAD") screen space, e.g., for the user interface 102. The tile renderer 136 can use these coordinate to align the GeoJSON layer with the image tiles. For instance, the tile renderer 136 can convert coordinates for the GeoJSON layer into coordinates for the image tiles.

Figure 2:
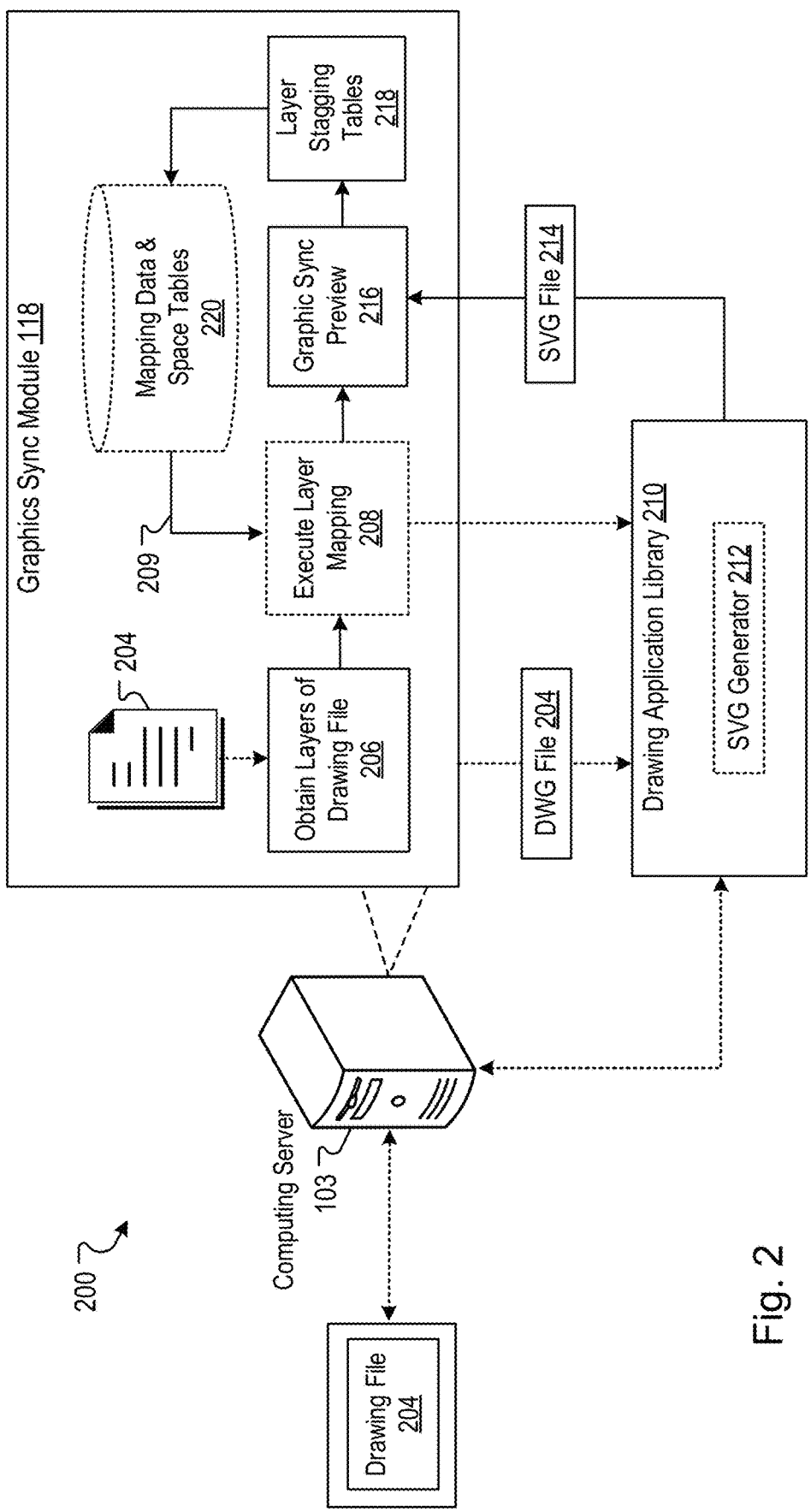
FIG. 2 illustrates an example graphics sync module.

FIG. 2 illustrates an example of the graphics sync module 118 of the system 100 described above with reference to FIG. 1. In particular, FIG. 2 shows an example system 200 that implements a synchronization framework used by the graphics sync module 118 to interpret and extract graphical data of an example drawing file 204, and to synchronize the extracted graphical data with information stored in a space management database 220 (described below).

The synchronization framework is described with reference to logical block diagram in the example of FIG. 2, which represents the graphics sync module 118 (and system 100) of FIG. 1. In some implementations, each of the logical blocks correspond to data processing operation performed by, or involves, the graphics sync module 118. The operations may be performed based on inputs and/or outputs generated by one or more other modules of the system 100.

In the example of FIG. 2, the system 200 is included within a server 103, for example, as a sub-system of hardware circuits (e.g., special-purpose circuitry) that includes two or more processor microchips. In general, server 103 can be one of multiple servers or cloud-based devices that may be included in the system 100 described above. The server 103 includes processors (e.g., CPU and GPU), memory, and data storage devices that collectively form the different components or computer systems of server 103.

The system 200 is operable to synchronize graphical elements of a drawing with graphical elements stored in the space management database to digitally render items of a building for presentation to the user 104. For example, the system 200 is operable to synchronize graphical elements of a drawing 204 that digitally render an office of a floor map with graphical elements that correspond to a version of the office that is stored at the space management database. More specifically, the graphics sync module 118 performs synchronization between graphical data for distinct layers in the drawing file 204 and corresponding graphical data in a space management database 220.

The drawing file 204 includes multiple respective layers that can represent data sections or other aspects of a drawing file (e.g., a DXF drawing file). Individual layers of a drawing file correspond to physical features or other characteristics of real-world constructs, such as an office, a closet, a bathroom, a security camera, or plumbing and/or electrical lines of a building. In addition to the layers, the file 204 can include various types of data that represent real-world entities.

As used herein, real-world entities are physical and non-physical items/things of the real world that can be graphically rendered and displayed (e.g., at a computer system display monitor) as a computer-generated object. Examples of a real-world entity that can be graphically rendered and displayed include a floor map, a floorplan, a graphical layout of a floor of a building, a campus location, buildings at the campus, rooms of the building, a computing device positioned in a room, a detectable wireless signal range of the computing device, or plumbing lines of the building.

Each layer of the drawing file 204 includes graphical data used to digitally render items of a floor map. The system 200 obtains data for a subset of layers of the drawing file (206). The system 200 can execute a mapping sequence (208) using the layer mapper 106, as described above with reference to FIG. 1. For example, the system 200 identifies a grouping of layers from the drawing file 204. In some implementations, the identified grouping of layers corresponds to the grouping of CAD layers 112 that are produced or identified using the layer mapper 106, as described above.

In some implementations, the system 200 retrieves mapping data 209 from a space management database 220 ("SMD 220") based on the identified grouping of layers. The SMD 220 includes multiple records and each record includes values for entities that correspond to items of the floor map. In some implementations, the SMD 220 is a proprietary database of entity information for multiple different items included in a building, such as rooms, equipment, or floorplans.

Relatedly, a layer among the subset of layers of the drawing file 204 can include entity records that are used to render a floorplan and can provide (or include) location and spacing data about items/features of the floorplan. For example, the location and spacing information can define a size of a room or types of items that are assigned to the room. Based on a set of entity records for a layer, the graphics sync module 118 is operable to extract spacing information about items of the floorplan and can associate the extracted spacing information with data associated with entity records or layer data for a new or existing floorplan managed at the SMD 220.

The graphics sync module 118 is configured to extract the graphical elements of the drawing file 204. The graphics sync module 118 executes an example workflow for reading and exporting graphical (or spatial) elements of layer data for each of the layers in a grouping of layers, such as the CAD layers 112 specified by a mapping output. For example, the mapping output may be generated by the audit module 114, the layer mapper 106, or both. In some implementations, to export this graphical data of the layers 112, the graphics sync module 118 calculates or computes dimensional bounds. This is described in more detail below with reference to the FIG. 3.

The graphics sync module 118 extracts values of the graphical data for a layer and synchronizes graphical data for different layers of the drawing file with graphical data in entity records stored in a space management database such as SMD 220. In some implementations, the data sync module 116 can detect that one or more of layers 112 include records for a new item that does not currently exist in the SMD 220. For example, the data sync module 116 can perform the detection based on an example layer mapping table of the layer mapper 106 that includes data for CAFM layers and data corresponding to the CAD layers. In some instances, the graphics data sync module 118 can use this information to create new entity records in the SMD 220 that can be used to render the new item. For example, the item may be a desk or room for a space or area on a floor plan for which there is no existing record in the SMD 220. In response to detecting that a new item is included among the layers 112, the graphics sync module 118 can create new entity records at SMD 220 and populate the newly created entity records with data for rendering graphical elements that were extracted for the new item.

The system 200 includes a drawing application library 210 that is in data communication with the graphics sync module 118. In some implementations, the drawing application library 210 is integrated in the computing server 103. In some other implementations, the drawing application library 210 is external to the computing server 103 and communicates with the graphics sync module 118 by way of the server 103. The drawing application library 210 can receive or obtain data for the drawing file 204 via the server 103 or based on communications with the graphics sync module 118, e.g., by way of the server 103. In some cases the drawing application library 210 communicates directly with the graphics sync module 118.

The application library 210 is configured to access a file generator 212. The file generator 212 is operable to generate an SVG file 214. In some implementations, the SVG file 214 is generated as an output of the drawing application library 210 based on operations performed by the file generator 212. In some implementations, the drawing application library 210 can also generate DXF files, and provide the SVG file 214 and/or the DXF file for file translation or previewing. For example, the graphics sync module 118 is configured to generate a graphics sync preview (216) based at least on the SVG file 214. The graphics sync preview allows for previewing graphical information that is linked to the groupings of layers in the mapping output.

For example, the graphics sync previews enable a user to preview a graphical rendering of a new or modified item (e.g., a nameplate or office chair) of a floor layer (or office layer) prior to synchronizing information for the item with database structures of the SMD 220. The graphics sync module 118 is configured to generate one or more layer staging tables based on data structures that are created at least from the SVG file 214. The one or more layer staging tables are generated based on layer mapping between CAD layers and CAFM layers.

The layer staging tables provide a function that is complementary to the graphics sync preview. For example, the graphics sync module 118 uses the layer staging tables to generate an interface that allows a user to preview graphical data for a modified item of a layer and reconcile graphical attributes (e.g., dimensions and spacing) of that item with an existing item of the SMD 220 that corresponds to the modified item. The layer staging tables feed CAFM layer data to the graphics sync module 118 for the floor layer of the new or modified item. The CAFM layers can be used for toggling layers on the graphics sync previews.

Figure 3:
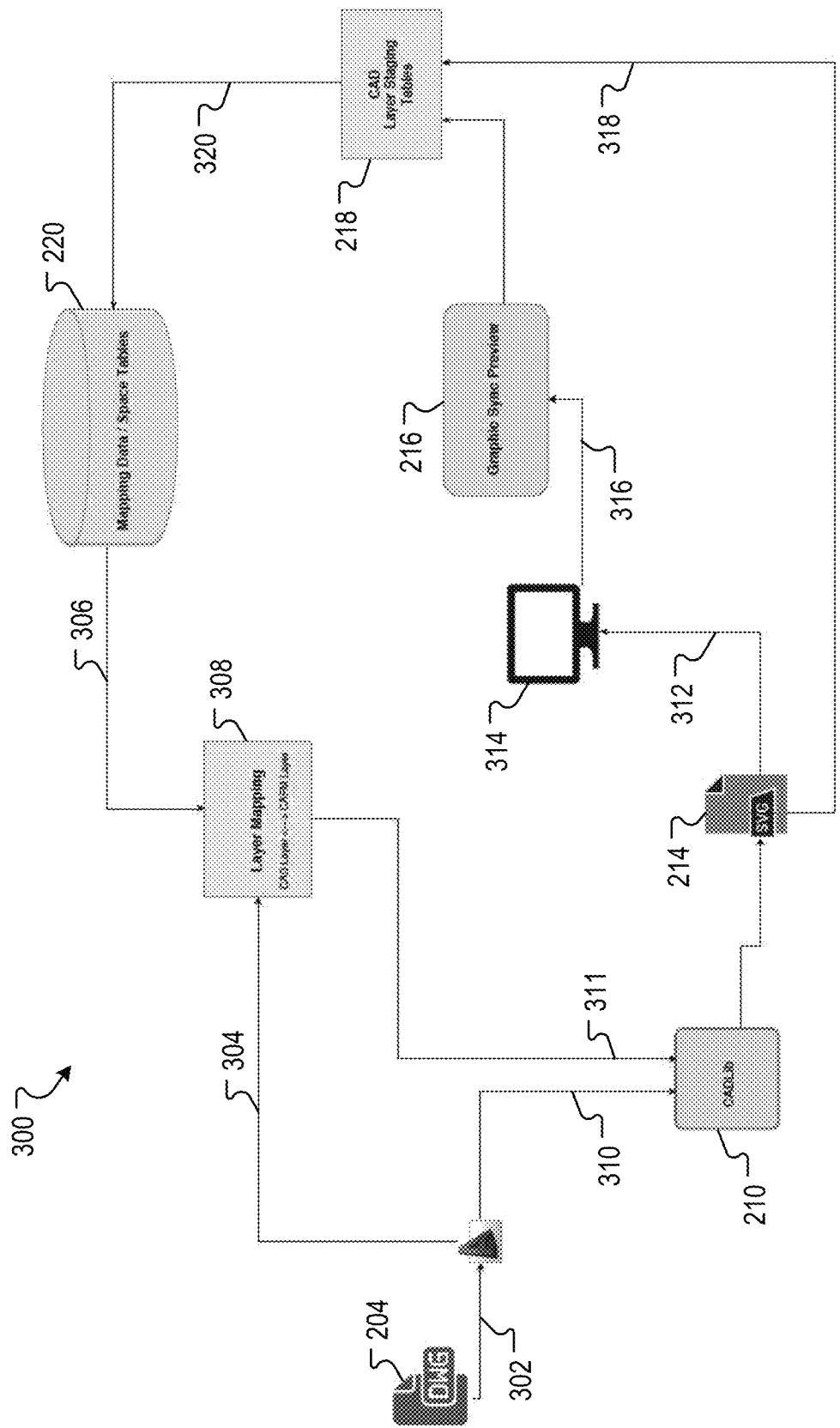
FIG. 3 illustrates an example flow diagram that indicates logical and computational operations of an example graphics sync module.

FIG. 3 illustrates an example process flow diagram 300 ("process 300") that indicates logical and computational operations of an example graphics synchronization framework of the graphics sync module 118. Execution of process 300 includes system 100 accessing or opening a drawing file based on operations performed (e.g., by a user) at an example computer-aided design application or program such as AutoCAD (302). In some implementations, an example software component or plug-in that functions as an add-on feature integrates with design application. The plug-in can provide an interface that includes a user-selectable input. This interface can correspond to interface 102 described above. The system 100 detects selection of the user-selectable input and generates a control parameter when the user selects the input.

The control parameter triggers the graphics synchronization framework of the graphics sync module 118 in response to user selection of the input. In some implementations, the user-selectable input is presented to the user as a "Sync Now" or "Graphic Sync" option/button at the interface of the plug-in. When the user selects the input and triggers the graphics synchronization framework, data associated with multiple sets of drawing layers (e.g., CAD layers) may be pulled from an example drawing file 204 (304). The drawing file may be a DWG file that is opened on an AutoCAD software program to which the plug-in is integrated.

The graphics sync module 118 obtains data for one or more CAFM layers from the SMD 220 (306). The graphics sync module 118 uses data for the CAFM layers to execute a mapping operation that maps the CAD layers to one or more of the CAFM layers that are pulled from tables in the SMD (308). For example, the system 100 can use the layer mapper 106 to perform the mapping operation. In some implementations, the layer mapper 106 is operable to generate a layer mapping window that enables a user to verify an output of the layer mapping operation as well as indicate whether an update of the output may be required.

As indicated above, in some examples a user may click on or select a "Graphic Sync" button on a plug-in software component that is integrated with the AutoCAD software. When the user selects this button and triggers the graphics synchronization framework, the example DWG file 204 is provided as an input to the drawing application library 210 (310). In some implementations, the drawing application library 210 is a third-party AutoCAD library that is managed and maintained by an entity external to system 100. The drawing application library 210 is configured to read the DWG file 204 for file translation and identifies the layers of the DWG file 204 that are exported by the graphics sync module 118. The drawing application library 210 converts the identified layers (e.g., and in some cases, converts only the identified layers) to SVG elements which are output to SVG file 214 for storage on a local computer where the AutoCAD software is installed. In some instances, the SVG file 214 is transferred to one or more staging tables of the graphics sync module 118.

Following selection of the "Graphic Sync" button, the graphics sync module 118 enables the data for the CAFM layers and layer mapping output data to be pulled and received as an additional input to the drawing application library (311). For example, the CAFM layer and layer mapping output data may be pulled from an example layer mapping table of the layer mapper 106. The layer mapping output corresponds to the CAD layers 112 described above.

Based on the file generator 212, multiple SVG files 214 are produced as an output from the drawing application library 210 (312). In some implementations, the quantity of SVG files generated by the file generator 212 and produced by the drawing application library 210 are equal to the number of CAFM layers that are passed as an input to the library 210. As discussed above, the SVG files 214 are produced at least by extracting or exporting graphical data of the CAD layers 112. In some implementations, the graphics sync module 118 calculates or computes dimensional bounds that can be used to generate: i) an interactive layer 124 represented by a GeoJSON file and ii) a visual layer 126 represented by the SVG files 214.

The graphics sync module 118 obtains the SVG files 214 and performs one or more file translation processes on those SVG files (314). In some implementations, to facilitate the file translation, the obtained SVG files are temporarily stored on a local computer where the AutoCAD software is installed. The graphics sync module 118 obtains and uses the SVG files 214 (e.g., the locally saved SVG files) to generate the graphic sync preview (316).

In some implementations, the system 100 uses the graphics sync module 118 to generate a graphic sync preview window, e.g., at the interface 102. The graphic sync preview window enables a user to view visual layers of the drawing file 204 as well as toggle between different layers to observe and interact with a translated floor map view. In some implementations, the graphics sync preview is representative of a merged graphics layer that is generated by overlaying dimensional coordinates of a GeoJSON file over dimensional coordinates of the SVG file 214, including one or more images tiles generated from the SVG file.

In addition to, or concurrent with, generating the graphics sync preview, the SVG files 214 are transferred to one or more staging tables of the graphics sync module 118 for further processing of the SVG files (318). For example, graphics sync module 118 is operable to extract data from the SVG files 214 and populate one or more data structures of the staging tables. In some implementations, the staging tables are generated and populated based on a workflow that is implemented to preview and stage new or modified portions of graphical layer data and entity records of the drawing file 204.

For example, a user can preview a set of graphical data that shows modifications made to an office space and reconcile that graphical data against existing information in entity records of the SMD 220. The existing information in entity records correspond to the modified items and layers that are specific to that office space. Following the previewing and staging operations, the SVG files 214 may be integrated with, or linked to, corresponding space tables of the SMD 220. For example, the SVG files 214 may be transferred to the SMD 220 as attachments for integration with the database tables (320).

Figure 4:
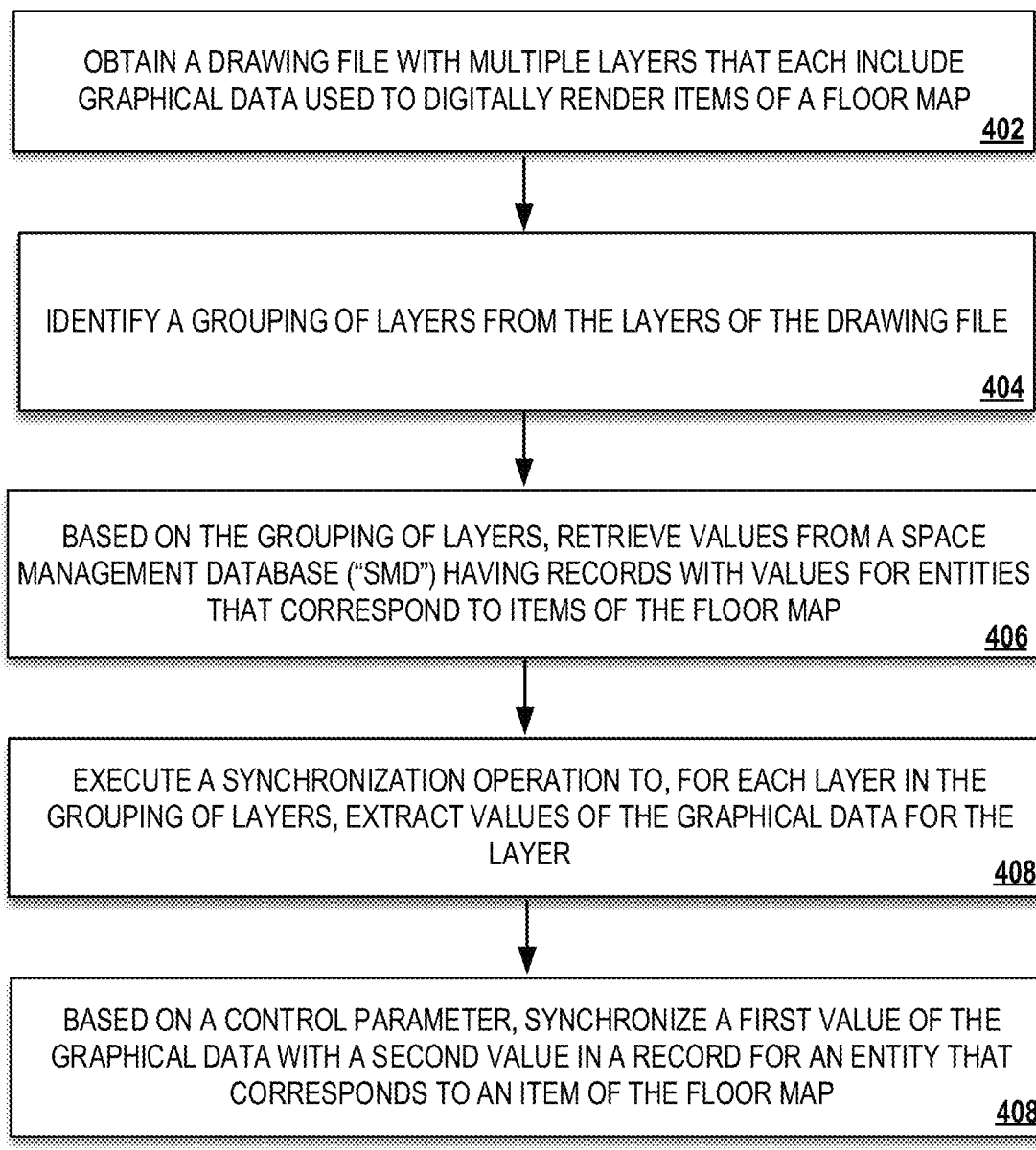
FIG. 4 is an example process for performing a graphics sync operation.

FIG. 4 is an example process 400 for performing a graphics sync operation. Process 400 can be implemented or executed using the system 100 and system 200 described above. The descriptions of process 400 may reference the above-mentioned computing resources of systems 100 and 200. The steps or actions of process 400 may be enabled by programmed firmware or software instructions that are executable by one or more processors of the resources described in this document. In some implementations, the steps of process 400 correspond to a method for syncing graphical data of a drawing file in with data stored in a space table of system 100.

Referring now to process 400, the system 100 obtains a drawing file 204 that includes multiple layers (402). Each of the multiple layers can include graphical data that is used to digitally render items of a floor map. For example, one or more of the items can be a first room on the floor map, items of the first room such as a desk or chair, or items of a floor represented by the floor map, such as a security camera or storage closet. The system 100 identifies a grouping of layers from the layers of the drawing file (404). For example, the grouping of layers may be identified based on a mapping output that specifies the CAD layers 112. As described above, the mapping output may be generated by the audit module 114, the layer mapper 106, or based on operations performed by both modules. The grouping of layers can be used to digitally render items that correspond to a subset of the layers in the drawing file 204. In some cases, the grouping of layers are used to digitally render an attribute of the first room, such as a dimension or spacing of the room relative to other items of a floor map.

Based on the grouping of layers, the system 100 retrieves values from a space management database that stores records having values for entities that correspond to items of the floor map (406). For each layer in the grouping of layers, the system 100 executes a synchronization operation to extract values of the graphical data for the layer (408). The grouping of layers can be used to generate an SVG file 214 and a corresponding geoJSON file. Each of the SVG file 214 and the geoJSON file are used to generate a graphics sync preview output that is presented to the user in response to a synchronization operation initiated by the user.

Based on a control parameter, the system 100 synchronizes a first value of the graphical data with a second value in a record for an entity that corresponds to an item of the floor map (410). For example, the control parameter is generated in response to selection of a user-selectable input that is presented to the user as a "Sync Now" or "Graphic Sync" button. The input may be presented at an interface of a software component (e.g., a plug-in). The software component integrates with a computer-aided design program, such as AutoCAD, to enable a user to synchronize data values for different layers of a drawing file with corresponding data values that are stored in the SMD 220.

The control parameter triggers a graphics synchronization framework of the graphics sync module 118 in response to user selection of the input. For example, a user can modify items of the first room or an attribute of the first room via the design application. The user can then use the "Sync Now" feature of the plug-in to preview how the modifications made to the first room will translate to, or integrate with, a version of the room that is stored or maintained at the SMD 220. Hence, synchronizing the first value with the second value can include synchronizing the graphical data from the drawing file used to render the first room with graphical data that is represented by data values stored in entity records of the SMD 220.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HyperText Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 5:
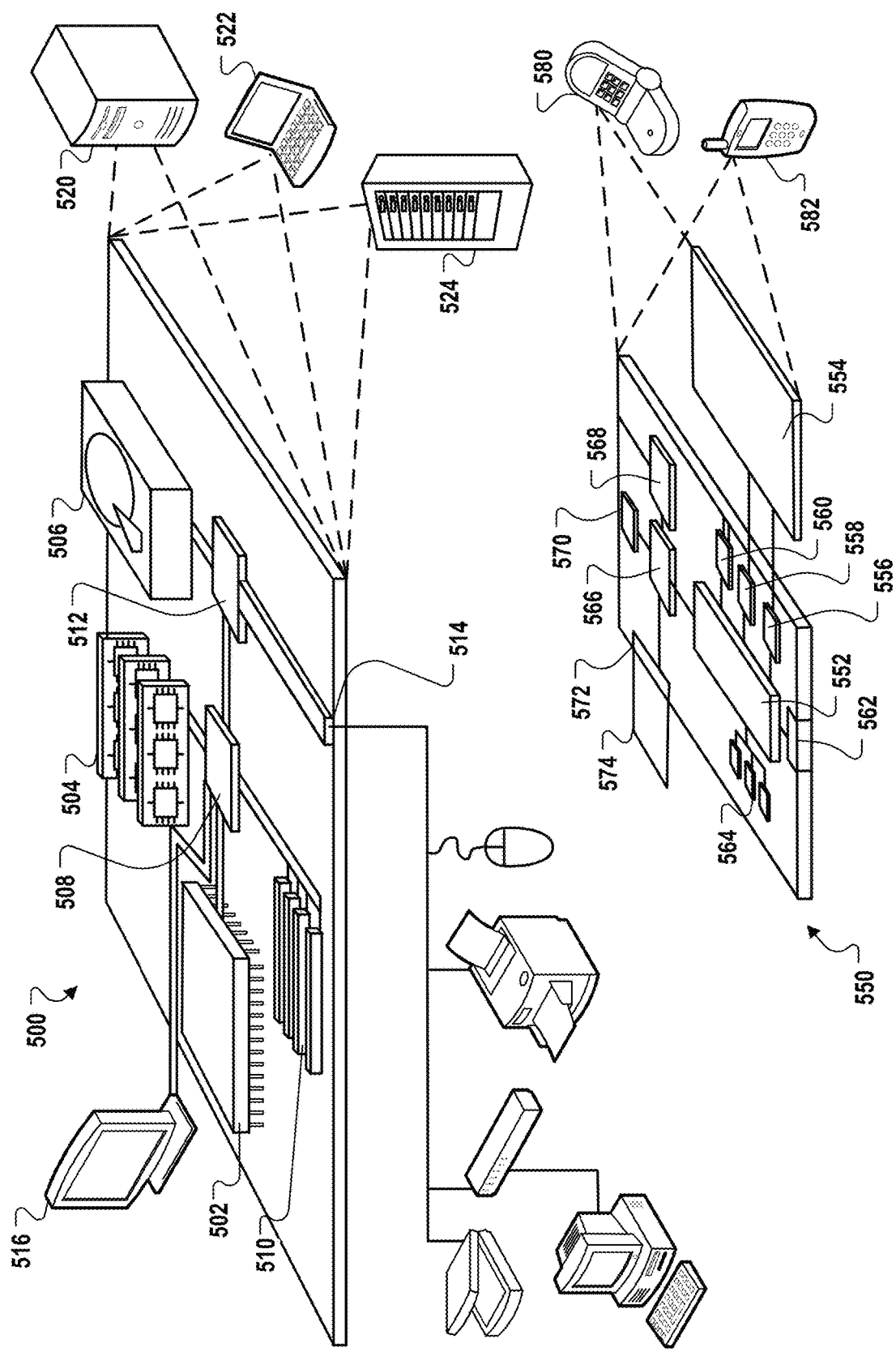
FIG. 5 is a block diagram of a computing system that can be used in connection with computer-implemented methods described in this document.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A computer-implemented method used to interpret data in drawing files, the computer-implemented method comprising:
identifying a grouping of layers from a plurality of layers of a drawing file;
based on the grouping of layers, retrieving values from a space management database;
executing a synchronization operation, comprising, for each layer in the grouping of layers:
extracting values of graphical data for each layer in the grouping of layers; and
synchronizing the graphical data from the grouping of layers of the drawing file used to render a representation of a first version of a first room with additional graphical data in entity records of the space management database associated with a second version of the first room.

2. The computer-implemented method of claim 1, further comprising:
obtaining the drawing file comprising the plurality of layers, each of the plurality of layers comprising graphical data used to digitally render items of a floor map; and
wherein:
the item is the first room on the floor map; and
the grouping of layers is used to digitally render an attribute of the first room.

3. The computer-implemented method of claim 1, wherein the synchronizing comprises:
processing a first value against a second value;
detecting an inconsistency between the first value and the second value; and
after detecting the inconsistency, overriding, based on a control parameter, i) the first value with the second value or ii) the second value with the first value.

4. The computer-implemented method of claim 3, wherein processing the first value against the second value comprises:
comparing the first value to the second value of the space management database based on the control parameter; and
determining whether to override the second value using the first value based on a value of the control parameter.

5. The computer-implemented method of claim 3, wherein executing the synchronization operation comprises:
generating a graphics sync preview state based on the grouping of layers, wherein the graphics sync preview state provides a digital rendering of a portion of graphical data in the drawing file based on synchronization of at least the first value with the second value.

6. The computer-implemented method of claim 1, wherein:
extracting the values of the graphical data for the layer comprises extracting data values that correspond to visual elements depicting a physical construct that represents an item of a floor map; and
the space management database comprises a respective record for an entity that corresponds to the item of the floor map.

7. The computer-implemented method of claim 1, further comprising:

obtaining an audit file that is based on a mapping file generated by a layer mapping module;
wherein the mapping file identifies the grouping of layers.

8. The computer-implemented method of claim 7, wherein:
the audit file is generated by an audit module; and
the audit module analyzes the mapping file to detect one or more deficiencies in data for each layer of the mapping file.

9. The method of claim 8, further comprising:
providing the audit file to a graphics sync module; and
executing, by the graphics sync module, the synchronization operation based on the audit file.

10. The computer-implemented method of claim 9, wherein executing the synchronization operation based on the audit file comprises:
executing, by the graphics sync module, the synchronization operation based on information in the audit file that includes supplementary data values used to: i) address deficiencies in the mapping file and ii) mitigate discrepancies associated with importation of the graphical data.

11. The computer-implemented method of claim 1, wherein the synchronizing further comprises:
modifying an attribute associated with the first room;
selecting an input for viewing the modifying of the attribute on the second version of the first room associated with the entity records of the space management database; and
outputting, on a display that is communicatively coupled to a computer, the modifying of the at least one attributed on the second version of the first room.

12. A system comprising a processing device and a non-transitory machine-readable storage device storing instructions used to interpret data in drawing files, the instructions being executable by the processing device to cause performance of operations comprising:
obtaining a drawing file comprising a plurality of layers, each of the plurality of layers comprising graphical data used to digitally render items of a floor map;
identifying a grouping of layers from the plurality of layers of the drawing file;
based on the grouping of layers, retrieving values from a space management database comprising records with values for entities that correspond to items of the floor map;
executing a synchronization operation, comprising, for each layer in the grouping of layers:
extracting values of the graphical data for the layer; and
synchronizing a first value of the graphical data with a second value in a record for an entity that corresponds to an item of the floor map, the synchronizing comprising synchronizing the graphical data from the grouping of layers of the drawing file used to render a representation of a first version of a first room with additional graphical data in entity records of the space management database associated with a second version of the first room.

13. The system of claim 12, wherein:
the item is the first room on the floor map; and
the grouping of layers is used to digitally render an attribute of the first room.

14. The system of claim 13, wherein synchronizing the first value with the second value comprises:
processing the first value against the second value;
detecting an inconsistency between the first value and the second value; and after detecting the inconsistency, overriding, based on a control parameter, i) the first value with the second value or ii) the second value with the first value.

15. The system of claim 13, wherein processing the first value against the second value comprises:
    comparing the first value to the second value of the space management database based on a control parameter; and
    determining whether to override the second value using the first value based on a value of the control parameter.

16. The system of claim 13, wherein executing the synchronization operation comprises:
    generating a graphics sync preview state based on the grouping of layers, wherein the graphics sync preview state provides a digital rendering of a portion of graphical data in the drawing file based on synchronization of at least the first value with the second value.

17. The system of claim 12, wherein extracting the values of the graphical data for the layer comprises:
    extracting data values that correspond to visual elements depicting a physical construct that represents the item of the floor map.

18. The system of claim 12, wherein the space management database comprises a respective record for the entity that corresponds to the item of the floor map.

19. The system of claim 12, wherein the operations further comprise:
    obtaining an audit file that is based on a mapping file generated by a layer mapping module of the system;
    wherein the mapping file identifies the grouping of layers.

20. The system of claim 19, wherein:
    the audit file is generated by an audit module of the system; and
    the audit module analyzes the mapping file to detect one or more deficiencies in data for each layer of the mapping file.

21. The system of claim 20, wherein the operations further comprise:
    providing the audit file to a graphics sync module of the system; and
    executing, by the graphics sync module, the synchronization operation based on the audit file.

22. The system of claim 21, wherein executing the synchronization operation based on the audit file comprises:
    executing, by the graphics sync module, the synchronization operation based on information in the audit file that includes supplementary data values used to: i) address deficiencies in the mapping file and ii) mitigate discrepancies associated with importation of the graphical data.

23. One or more non-transitory machine-readable storage devices storing instructions used to interpret data in drawing files, the instructions being executable by a processing device to cause performance of operations comprising:
    obtaining a drawing file comprising a plurality of layers, each of the plurality of layers comprising graphical data used to digitally render items of a floor map;
    identifying a grouping of layers from the plurality of layers of the drawing file;
    based on the grouping of layers, retrieving values from a space management database comprising records with values for entities that correspond to items of the floor map;
    executing a synchronization operation, comprising, for each layer in the grouping of layers:
        extracting values of the graphical data for the layer; and
        synchronizing a first value of the graphical data with a second value in a record for an entity that corresponds to an item of the floor map, the synchronizing comprising synchronizing the graphical data from the grouping of layers of the drawing file used to render a representation of a first version of a first room with additional graphical data in entity records of the space management database associated with a second version of the first room.

* * * * *